US008963694B2

(12) United States Patent
Nystrom et al.

(10) Patent No.: US 8,963,694 B2
(45) Date of Patent: Feb. 24, 2015

(54) SYSTEM AND METHOD FOR REMOTE CONTROLLED DEVICE SELECTION BASED ON DEVICE POSITION DATA AND ORIENTATION DATA OF A USER

(75) Inventors: Martin Nystrom, Lund (SE); Erik Ahlgren, Lund (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 766 days.

(21) Appl. No.: 12/975,826

(22) Filed: Dec. 22, 2010

(65) Prior Publication Data

US 2012/0154195 A1 Jun. 21, 2012

Related U.S. Application Data

(60) Provisional application No. 61/424,309, filed on Dec. 17, 2010.

(51) Int. Cl.
*G05B 11/01* (2006.01)
*H04N 21/422* (2011.01)
(Continued)

(52) U.S. Cl.
CPC ..... *H04N 21/42226* (2013.01); *H04N 21/4131* (2013.01); *H04N 21/42204* (2013.01); *H04N 21/43637* (2013.01); *H04N 21/422* (2013.01); *H04N 21/4223* (2013.01)
USPC ............. 340/12.22; 340/572.1; 340/4.11; 340/426.13; 340/815.6; 340/10.1; 340/539.1; 340/12.24; 340/12.5; 340/12.51; 340/5.1; 340/5.2; 340/5.61; 340/5.65; 340/5.8; 340/539.14; 341/22; 341/23; 341/169; 341/173; 341/174; 341/175; 341/176; 345/156; 345/157; 345/158; 345/163; 345/169; 345/172; 345/173; 345/174; 348/14.05; 348/114; 348/211.99; 348/734

(58) Field of Classification Search
None
See application file for complete search history.

(56) References Cited

U.S. PATENT DOCUMENTS 4,837,851 A * 6/1989 Weinblatt ................... 340/573.1
6,452,544 B1 * 9/2002 Hakala et al. ............ 342/357.31
(Continued)

FOREIGN PATENT DOCUMENTS

WO WO 2005/121937 A2 12/2005

OTHER PUBLICATIONS

European Search Report and Written Opinion for corresponding European Application No. 11009816.7, dated May 8, 2014.
(Continued)

*Primary Examiner* — Curtis King
(74) *Attorney, Agent, or Firm* — Renner, Otto, Boisselle & Sklar, LLP

(57) ABSTRACT

A system and method are provided for selecting a remote controlled device to be controlled from among a plurality of remote controllable devices. The system includes an electronic device having a registration interface configured to register device data corresponding to the plurality of remote controllable devices, a position locator configured to determine position data corresponding to a position of the electronic device, and an orientation interface configured to receive orientation data corresponding to an orientation of a user. A controller is configured to select the remote controlled device based on the device data, the position data, and the orientation data. The plurality of remote controllable devices each may include a respective data source configured to provide the device data, and a headset may be configured to generate the orientation data.

19 Claims, 5 Drawing Sheets

(51) Int. Cl.
*H04N 21/41* (2011.01)
*H04N 21/4363* (2011.01)
*H04N 21/4223* (2011.01)

(56) References Cited

U.S. PATENT DOCUMENTS

| | | | | |
|---|---|---|---|---|
| 6,812,881 | B1* | 11/2004 | Mullaly et al. | 341/176 |
| 7,116,229 | B1* | 10/2006 | Miramontes | 340/12.28 |
| 2004/0121725 | A1* | 6/2004 | Matsui | 455/3.06 |
| 2004/0125044 | A1* | 7/2004 | Suzuki | 345/1.1 |
| 2005/0108646 | A1* | 5/2005 | Willins et al. | 715/723 |
| 2005/0206549 | A1* | 9/2005 | Stefanik | 341/176 |
| 2005/0272477 | A1* | 12/2005 | Boykins et al. | 455/569.1 |
| 2006/0244677 | A1* | 11/2006 | Dempski | 345/8 |
| 2007/0236381 | A1 | 10/2007 | Ouchi et al. | |
| 2009/0054067 | A1 | 2/2009 | Gauthier et al. | |
| 2009/0300535 | A1* | 12/2009 | Skourup et al. | 715/773 |
| 2010/0001893 | A1* | 1/2010 | Kim et al. | 341/176 |
| 2011/0032071 | A1* | 2/2011 | Tondering | 340/4.31 |
| 2011/0072373 | A1* | 3/2011 | Yuki | 715/764 |
| 2011/0157168 | A1* | 6/2011 | Bennett et al. | 345/419 |
| 2012/0013449 | A1* | 1/2012 | Penisoara et al. | 340/12.5 |
| 2012/0068914 | A1* | 3/2012 | Jacobsen et al. | 345/8 |
| 2012/0077437 | A1* | 3/2012 | Agevik | 455/41.2 |
| 2012/0169482 | A1* | 7/2012 | Chen et al. | 340/12.52 |
| 2013/0006529 | A1* | 1/2013 | Miyamoto | 701/516 |

OTHER PUBLICATIONS

European Search Report and Written Opinion for corresponding European Application No. 11009816.7, dated Aug. 5, 2014.

* cited by examiner

SYSTEM AND METHOD FOR REMOTE CONTROLLED DEVICE SELECTION BASED ON DEVICE POSITION DATA AND ORIENTATION DATA OF A USER

RELATED APPLICATION DATA

The present application claims the benefit of U.S. Provisional Application Ser. No. 61/424,309, filed Dec. 17, 2010, the disclosure of which is herein incorporated by reference in its entirety.

TECHNICAL FIELD OF THE INVENTION

The technology of the present disclosure relates generally to portable electronic devices, and more particularly to a system and methods for selecting a remote controlled device to be controlled from among a plurality of remote controllable devices.

DESCRIPTION OF THE RELATED ART

Portable electronic devices, such as mobile telephones, media players, personal digital assistants (PDAs), and others, are ever increasing in popularity. To avoid having to carry multiple devices, portable electronic devices are now being configured to provide a wide variety of functions. For example, a mobile telephone may no longer be used simply to make and receive telephone calls. A mobile telephone may also be a camera (still and/or video), an Internet browser for accessing news and information, an audiovisual media player, a messaging device (text, audio, and/or visual messages), a gaming device, a personal organizer, and have other functions as well.

In addition, there has been a substantial increase in the number of electronic devices that may be subjected to remote control. For example, various audiovisual devices, such as televisions, DVD, BD and other disc players, audio receivers, music devices, gaming systems, and the like conventionally are operated by remote control. Households also may now include remote control lighting and related devices (e.g., ceiling fans and the like), remote control toys, remote control heating systems or thermostats, and numerous other devices.

As the number of remote controlled devices increases, it requires increasingly more effort to select the particular device to be controlled. Of course, each remote controlled device may be associated with its own remote control device, which rapidly becomes inefficient as the number of devices increases.

There are also "universal remotes," which are remote control devices that may have a capability to control multiple devices, even devices made by different manufactures. For example, various remote control devices may have the capability to control multiple audiovisual devices, such as televisions, disc players, cable or satellite television boxes, receivers, and the like. Often, a remote control of this type may have function input buttons that permit the user to select a particular category of controlled device (e.g., television, disc player, etc.), or to cycle through connected devices in a given system setup until the selected device corresponds to the device as to which remote control is desired. As the number of system devices increases, however, selection either by a categorical input button or by cycling through connected devices becomes tedious.

In addition, "universal remotes", so called, are rarely truly universal. Such remote control devices may be limited by manufacturer, model, and similar device characteristics. In particular, even as the number of audiovisual devices controllable by a single remote has increased, even the most versatile remote control devices still rarely can control the vast array of devices encompassing lighting systems, thermostats, toys, and other non-audiovisual devices. Conventional remote control systems, therefore, have proven deficient as being cumbersome and incomplete in the manner by which a remote controlled device may be selected from among a plurality of remote controllable devices.

With respect to portable electronic devices, the use of a headset in conjunction with a portable electronic device also is becoming more common. Typically, a headset will be in wireless communication with a portable electronic device, such as a mobile telephone. The wireless interface may be a Bluetooth, RF, infrared, or other wireless interface as are known in the art. Through the headset, one may make and receive telephone calls, or access other device functions, in a "hands free" mode. Despite the ever increasing use and functionality of portable electronic devices and headsets, such devices are not being used to their full potential, and particularly have not been employed efficiently in remote control systems for remotely controlling multiple devices.

SUMMARY

To improve the consumer experience with portable electronic devices, there is a need in the art for an improved system and method for remotely controlling multiple devices within a common remote control system. In particular, there is a need in the art for an improved manner of efficiently selecting a remote controlled device to be controlled from among multiple remote controllable devices in the system.

In accordance with embodiments of the present invention, essentially, from among multiple devices, a user can select a given device to be controlled simply by looking at it. To do so, the system described herein may select a device based upon three parameters: (1) remote controllable device data that may indicate the location or position of a remote controllable device within a room or other setting; (2) user electronic device position data indicating the position of the user in the room or setting, from which the relative positions of the remote controllable devices and the user may be determined; and (3) orientation data indicating the orientation or viewing direction of the user. From such parameters, a remote controlled device may be selected from among a plurality of remote controllable devices based upon a viewing direction or orientation of the user.

Therefore, according to one aspect of the invention, an electronic device includes a registration interface configured to register device data corresponding to a plurality of remote controllable devices, a position locator configured to determine position data corresponding to a position of the electronic device, and an orientation interface configured to receive orientation data corresponding to an orientation of a user. A controller is configured to select a remote controllable device to be controlled from among the plurality of remote controllable devices, the selection being based on the device data, the position data, and the orientation data.

According to one embodiment of the electronic device, the registration interface includes a wireless interface for receiving the device data by a wireless communication.

According to one embodiment of the electronic device, the wireless interface includes at least one of a Bluetooth, RFID, near field communication, or WI-FI interface.

According to one embodiment of the electronic device, the electronic device further includes a device selection database for storing the device data corresponding to the plurality of remote controllable devices.

According to one embodiment of the electronic device, the orientation interface includes a wireless interface for receiving the orientation data by a wireless communication.

According to one embodiment of the electronic device, the electronic device further includes an output interface configured to output a device selection signal corresponding to the selected remote controlled device.

Another aspect of the inventions is a system for selecting a remote controlled device to be controlled from among a plurality of remote controllable devices. The system includes a plurality of remote controllable devices, wherein each of the plurality of remote controllable devices includes a data source configured to provide device data corresponding to a respective remote controllable device. An orientation detector is configured to generate orientation data corresponding to an orientation of a user. An electronic device includes a device selector, wherein the device selector is configured to receive the device data and the orientation data, and configured to select the remote controlled device from among the plurality of remote controllable devices based on the device data and the orientation data.

According to one embodiment of the system, the device selector is further configured to determine position data corresponding to the position of the electronic device, and to select the remote controlled device from among the plurality of remote controllable devices additionally based on the position data.

According to one embodiment of the system, the at least one of the data sources is configured to transmit the device data wirelessly to the device selector.

According to one embodiment of the system, the at least one data source includes an electronic tag containing the device data, and the electronic device includes a reading device for reading the device data from the electronic tag.

According to one embodiment of the system, the at least one data source includes a wireless signal emitter configured to transmit a signal containing the device data, and the electronic device includes a receiver for receiving the signal containing the device data.

According to one embodiment of the system, the orientation detector includes a headset to be worn by the user, the headset including a sensor, and the orientation data corresponds to an orientation of the headset as detected by the sensor.

According to one embodiment of the system, the headset sensor includes a motion detector for detecting the motion of the headset, and the headset generates the orientation data based on the detected motion.

According to one embodiment of the system, the at least one data source includes a wireless signal emitter configured to transmit a signal, the headset sensor includes a receiver for receiving the signal transmitted from one of the at least one data source, and the headset generates the orientation data based on the received signal.

According to one embodiment of the system, the headset sensor includes a digital camera, and the orientation data is image data generated by the digital camera.

According to one embodiment of the system, the headset and the electronic device includes a wireless interface for transmitting the orientation data from headset to the electronic device by a wireless communication.

According to one embodiment of the system, the electronic device further includes an output interface configured to output a device selection signal corresponding to the selected remote controlled device, and the system further includes a remote control device configured to receive the device selection signal and control the selected remote controlled device.

Another aspect of the invention is a method of selecting, with a user electronic device, a remote controlled device for remote control from among a plurality of remote controllable devices. The method includes the steps of registering device data corresponding to the plurality of remote controllable devices, determining position data corresponding to a position of the user electronic device, receiving orientation data corresponding to an orientation of the user, and selecting a remote controlled device to be controlled from among the plurality of remote controllable devices, the selection being based on the device data, the position data, and the orientation data.

According to one embodiment of the method, the method further includes upon receiving the orientation data, initiating a timer, and determining whether a threshold time of the timer is reached. If the threshold time is reached, the method includes selecting the remote controlled device, and if the threshold time is not reached, the method includes receiving new orientation data.

According to one embodiment of the method, the method further includes determining whether a release signal is received. If a release signal is not received, the method includes maintaining the selection of the remote controlled device, and if a release signal is received, the method includes selecting another remote controlled device for remote control from among the plurality of remote controllable devices.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

The present invention provides an enhanced system for selecting a remote controlled device to be subject to remote control from among numerous remote controllable devices. Essentially, a user may select a device to be remotely controlled simply by looking at the desired device. As indicated generally above, such a system may select a device based upon three parameters: (1) remote controllable device data that may indicate the location or position of a remote controllable device within a room or other setting; (2) user electronic device position data indicating the position of the user in the room or setting, from which the relative positions of the remote controllable devices and the user may be determined; and (3) orientation data indicating the orientation or viewing direction of the user.

Figure 1:
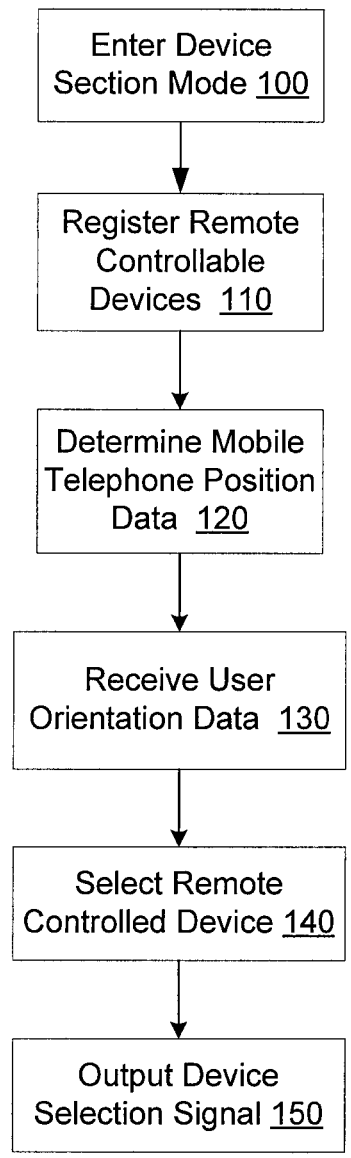
FIG. 1 depicts an overview of an exemplary method of selecting a remote controlled device for remote control from among a plurality of remote controllable devices.

In accordance with such features, FIG. 1 depicts an overview of an exemplary method of selecting a device for remote control from among a plurality of remote controllable devices. The method of FIG. 1 represents a general overview, and each step is described in more detail below. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method overview may begin at step 100, at which a device selection mode may be entered. Entering the device selection mode essentially turns on the various features of the device selection system. At step 110, a plurality of remote controllable devices may be registered into the system. Device registration may include generating device data corresponding respectively to each of a plurality of remote controllable devices. The device data may include device identification information, and information associating the device with a device location or position within a room or other setting. Device registration further may include storing the device identification and location data into a device selection database for subsequent access.

At step 120, user electronic device position data may be determined indicating the location or position of the user within the room or setting. In exemplary embodiments, the position data may be determined based on position data corresponding to the position of a mobile telephone (or other suitable portable electronic device) in the user's possession, utilizing a positioning capability of the user portable electronic device. From the remote controllable device data of step 110 and the mobile telephone position data of step 120, the positioning of the user relative to each of the plurality of remote controllable devices is known.

At step 130, user orientation data may be received corresponding to an orientation of the user. In this manner, the orientation data is indicative of the direction to which the user is looking or facing. Based on the remote controllable device data, the user mobile telephone position data, and the user orientation data, at step 140 a remote controlled device is selected for remote control from among the plurality of remote controllable devices. In particular, the device at which the user is looking is selected to be the remotely controlled device. At step 150, a device selection signal may be outputted indicating the selected remote controlled device, and thereafter the selected device may be remotely controlled by any suitable means.

As stated above, the method of FIG. 1 represents an overview of the device selection process, with the steps being described in more detail below. Embodiments of the present invention will now be described with reference to the additional drawings, wherein like reference numerals are used to refer to like elements throughout. It will be understood that the figures are not necessarily to scale.

The following description is made in the context of a conventional mobile telephone. It will be appreciated that the invention is not intended to be limited to the context of a mobile telephone and may relate to any type of appropriate electronic device, examples of which include a media player, a gaming device, or a desktop or laptop computer. For purposes of the description herein, the interchangeable terms "electronic equipment" and "electronic device" also may include portable radio communication equipment. The term "portable radio communication equipment," which sometimes is referred to as a "mobile radio terminal," includes all equipment such as mobile telephones, pagers, communicators, electronic organizers, personal digital assistants (PDAs), smartphones, and any communication apparatus or the like.

Figure 2:
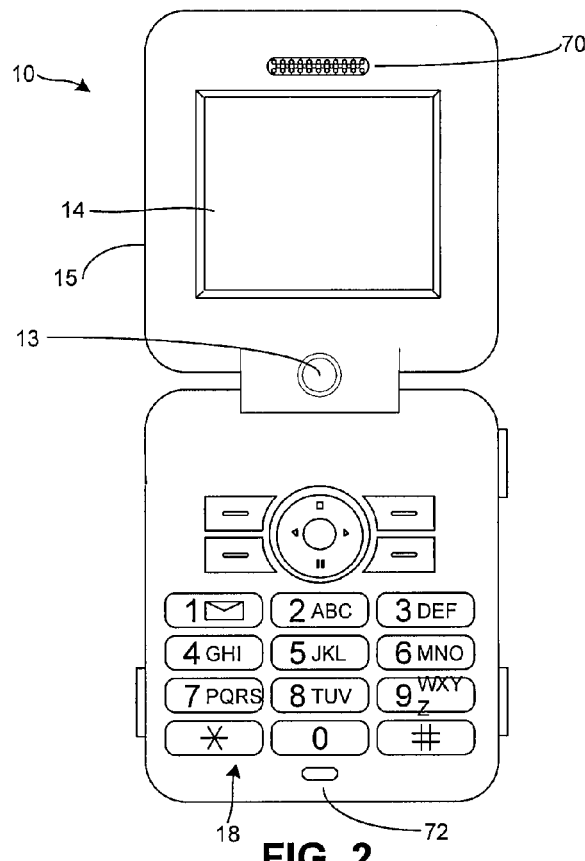
FIG. 2 is a schematic view of a mobile telephone as an exemplary portable electronic device for use in accordance with embodiments of the present invention.
Figure 3:
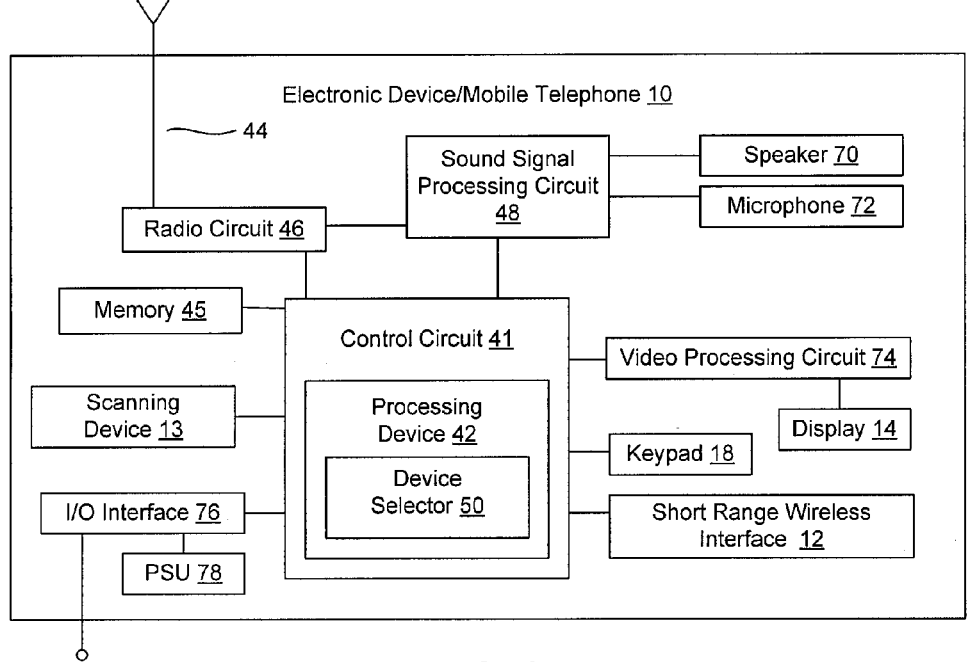
FIG. 3 is a schematic block diagram depicting operative portions of the mobile telephone of FIG. 2.
Figure 4:
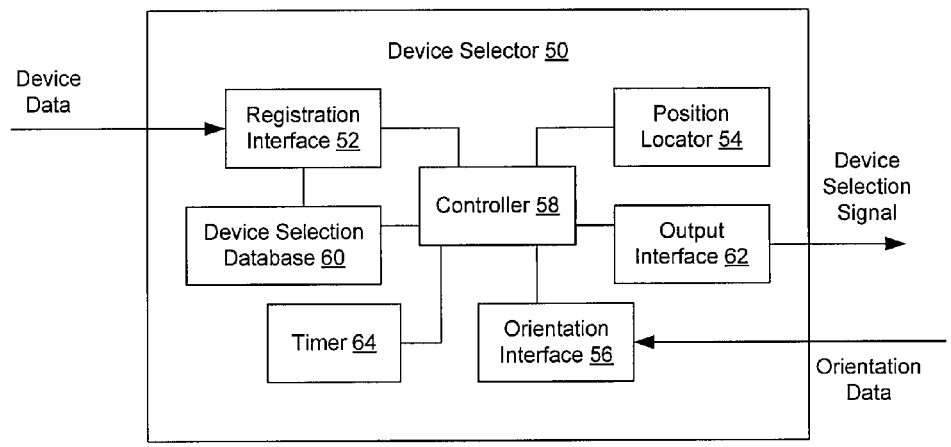
FIG. 4 is a schematic block diagram depicting operative portions of an exemplary device selector for use in accordance with embodiments of the present invention.

Referring to FIGS. 2-4, an exemplary electronic device in the form of a mobile telephone 10 is described, which is configured to select a remote controlled device to be controlled from among a plurality of remote controllable devices. FIG. 2 depicts an exemplary mobile telephone 10 for use in a system of remote controlled devices. FIG. 3 represents a functional block diagram of operative portions of the mobile telephone 10 of FIG. 2. Mobile telephone 10 may be a clamshell telephone with a flip-open cover 15 movable between an open and a closed position. In FIG. 1, the cover is shown in the open position. It will be appreciated that mobile telephone 10 may have other configurations, such as a "block" or "brick" configuration, a slide or swivel cover configuration, or other configurations as are known in the art.

As depicted in FIG. 3, mobile telephone 10 may include a primary control circuit 41 that is configured to carry out overall control of the functions and operations of the mobile telephone 10. The control circuit 41 may include a processing device 42, such as a CPU, microcontroller or microprocessor. Among their functions, to implement the features of the present invention, the control circuit 41 and/or processing device 42 may comprise a controller that may execute program code embodied as part of a device selector 50. It will be apparent to a person having ordinary skill in the art of computer programming, and specifically in application programming for cameras, mobile telephones or other electronic devices, how to program a mobile telephone to operate and carry out logical functions associated with device selector 50. Accordingly, details as to specific programming code have been left out for the sake of brevity. Also, while the code may be executed by control circuit 41 in accordance with an exemplary embodiment, such controller functionality could also be carried out via dedicated hardware, firmware, software, or combinations thereof, without departing from the scope of the invention.

In addition to and in conjunction with executable program code, the device selector 50 may incorporate components configured to perform the device selection processes. FIG. 4 is a functional block diagram depicting operative portions of an exemplary device selector 50. Commensurate with the method steps of FIG. 1, as depicted in FIG. 4, the device selector 50 may include a registration interface 52 configured to register device data corresponding to a plurality of remote controllable devices; a position locator 54 configured to determine position data corresponding to a position of the mobile telephone 10; an orientation interface 56 configured to receive orientation data corresponding to an orientation of a user; and a controller 58 configured to select a remote controlled device to be controlled from among the plurality of remote controllable devices. The device selection of the controller may be based on the device data, the electronic device position data, and the user orientation data.

A user may enter a device selection mode by any suitable mechanism for administering inputs to the mobile telephone 10. As seen in FIGS. 2 and 3, for example, mobile telephone 10 has a keypad 18 that provides for a variety of user input operations. Keypad 18 typically includes alphanumeric keys for allowing entry of alphanumeric information such as telephone numbers, phone lists, contact information, notes, etc. In addition, keypad 18 typically includes special function keys such as a "send" key for initiating or answering a call, and others. Some or all of the keys may be used in conjunction with the display as soft keys. Keys or key-like functionality also may be embodied as a touch screen associated with a display 14. The keypad may be employed to enter the device selection mode using a dedicated key input, by inputting a selection from a menu displayed on display 14 or by any other suitable input mechanisms as are known in the art.

In exemplary embodiments, once the device selection mode is entered, a user may have at least two options. First, the user may select to perform a device registration process. Generally, the registration process (FIG. 1, step 110) permits the user to register a plurality of devices that may be subject to remote control as part of a system of remote controllable devices. Second, the user may select to perform a device selection process (FIG. 1, steps 120-140), by which a user selects a device to be controlled from among the plurality of registered remote controllable devices of the system. As with entering the device selection mode above, a user may choose whether to perform device registration or device selection utilizing the keypad 18 and/or display 14 with any suitable input mechanism.

It will be understood that at first initiation of the system, no devices would be registered. Accordingly, at least at the first activation, registration would be the most reasonable user choice. Accordingly, device registration will now be described.

Referring to FIG. 4, the device selector 50 of the mobile telephone 10 may include a device selection database 60. As further explained below, the device selection database 60 may contain stored device data for each of the plurality of specific devices that may be remotely controlled in the remote control system. For example, the device data stored in the database 60 may include, for each remote controllable device, data identifying the controllable device, data identifying the specific location of the device within a room or other setting, and a control bit or data item indicating whether the remote controllable device is generally stationary or moveable during use. In accordance with such features, therefore, the mobile telephone 10 performs a registration process by which the mobile phone gathers device data with respect to each remote controllable electronic device in the system.

The registration process may be described by reference to FIGS. 3-5. The device selector 50 may include a registration interface 52 to operate as part of the registration process. In particular, the registration interface 52 may operate via a short range wireless interface 12 of the mobile telephone 10 to register a plurality of remote controllable devices 20 by receiving device data over a wireless communication. For example, the short range wireless interface 12 may be a Bluetooth, RFID, Near Field Communication (NFC) device, or like interface for wirelessly communicating with the remote controllable devices 20 over a short range interface. The communication may be performed via an antenna 44 of the mobile phone 10 utilized generally for communications, or by a separate and dedicated antenna or comparable receiving device (not show).

Figure 5:
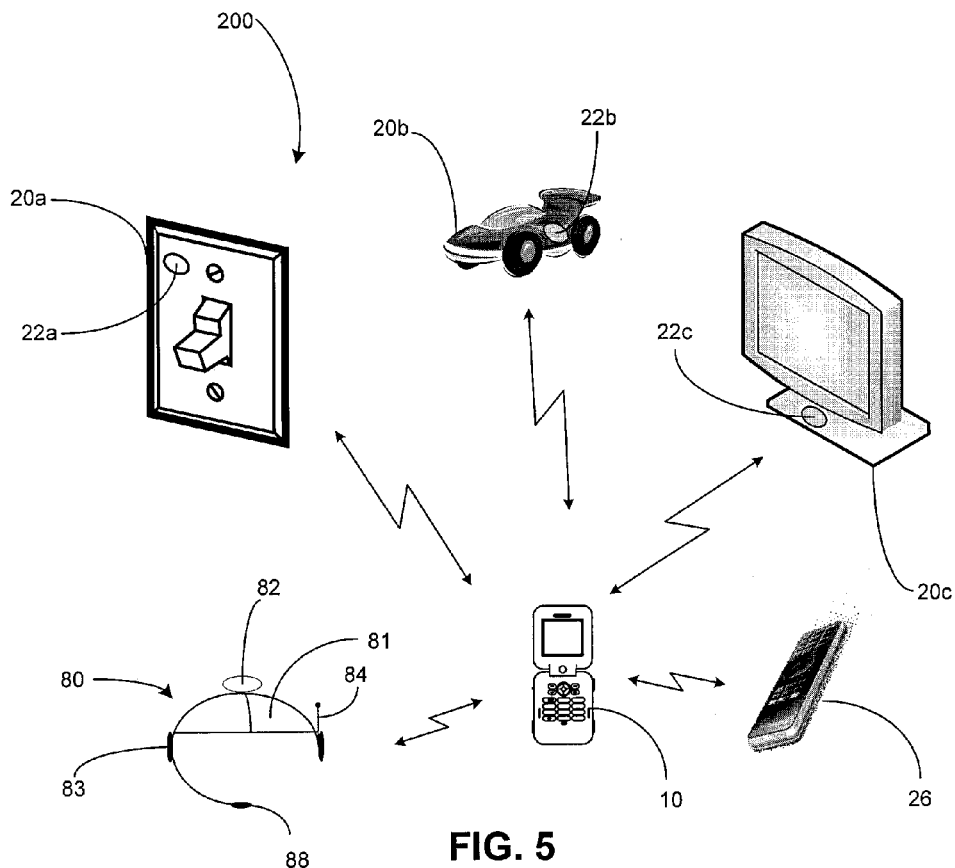
FIG. 5 is a schematic diagram depicting an exemplary remote control system in accordance with embodiments of the present invention.

FIG. 5 depicts an exemplary remote control system 200 in which the mobile telephone 10 may register three exemplary remote controllable devices 20a-c. In the example of FIG. 5, the remote controllable devices include a light switch 20a, a remote control toy car 20b, and a television 20c. It will be appreciated FIG. 5 represents an example, and the number and/or category of remote controllable devices 20 may vary widely to encompass any potentially remote controlled device.

As depicted in FIG. 5, each remote controllable device 20a-c has a corresponding data source 22a-c containing device data corresponding to the remote controllable device. For example, the device data corresponding to the remote controllable device may include device identifying information, as well as device position or location information as to the device's position within the system of the plurality of remote controllable devices. The device position information may correspond to a respective device's location or position with a room or other setting. In one embodiment, such position may represent a position relative to a typical location or location range of the user during the controlled circumstances. For example, if the user typically would control a light switch upon entering or leaving the room, the device data may include the location of the light relative to the room entrance. Another common control position may be the user sitting on a chair or couch, or other suitable viewing location relative to audiovisual equipment. Device data for the light switch versus the television would differ commensurately with the respective positions of the devices in the room relative to the various control positions. In one embodiment, precise device location information can be generated by identifying device location in a room relative to a selected position from at least three different angles. In this manner, in later portions of the device selection process a specific device may be targeted in part based on its location in the room relative to a user at various positions in the same room.

The device data in the data sources 22a-c may also include a control bit or data item indicating whether the remote controllable device is a moving device or a stationary device (or a substantially stationary device) while in use. For example, in FIG. 5 the light switch and television set would be considered stationary devices in use, while the remote control toy car would be considered a moving device.

Device data contained in the data sources 22a-c may be transmitted by a wireless communication to the mobile telephone 10 utilizing the registration interface 52 via the short range wireless interface 12. The wireless transmission of device data as between the devices 20a-c and the mobile telephone 10 is indicated by the jagged arrow lines in FIG. 5. The nature of data sources 22a-c may depend upon the technology utilized to read the data with the mobile telephone 10. For example, if the short range wireless interface employs RFID or certain NFC technologies, the data sources 22a-c may be in the form of passive electronic tags that may be read over the short range wireless interface by a corresponding RFID or NFC reading device. In this manner, the mobile telephone 10 may include a reading device, such as a scanning device 13, for reading RFID or NFC electronic tags, barcodes, or similar information containing electronic tags (see FIGS. 2 and 3). Alternatively, the data sources 22*a-c* may includes actively emitting devices that would transmit the device data by a wireless communication, as may be employed over a Bluetooth, WI-FI, or comparable wireless interface. Particularly if a device location is being calculated by taking multiple measurements at different angles, an actively transmitting remote controllable device may be preferable to a passive electronic tag.

The registration process also may differ as between a stationary device, like the light switch and television, versus a moving device like the toy car. Because the location of stationary devices does not change, the device data essentially remains the same and the registration process need only be performed once (or updated only occasionally, for example, on a rare occasion a user might relocate the television). The toy car, however, may be in a different position each time use is initiated. As such, the registration process as to the toy car may be more frequent. For moveable devices, therefore, an actively emitting technology would be preferred for the data source 22*b* of the toy car to minimize the user effort in registering the moving device each time it is used. The moveable device may emit a pulse signal that may be detected by the mobile telephone 10 to register the moveable device each time use of such device is initiated. In other words, therefore, the registration process may be performed automatically by the data source of a frequently moving device in response to a pulse signal emitted from the moving device.

In addition, although a short range wireless interface may be preferred, other types of interfaces may be employed with the mobile telephone 10 to obtain the device data from the data sources 22*a-c*. For example, wired connections, such as a USB connection or the like, may be employed. In similar manner, removable storage devices, such as USB memory devices or SD cards, may be employed to store and transfer device data from the controllable devices 20*a-c* to the mobile telephone 10. In this manner, a removable storage device may act as an intermediate device for downloading device data from the remote controllable devices, and then uploading the device data into the device selection database 60 of the device selector 50. In other embodiments, a user may input the device data into the mobile telephone manually using the keypad 18 or other conventional input device common to portable electronic devices.

Regardless of the precise technology employed, each of the remote controllable devices 20*a-c* may be registered by the mobile telephone 10 by registering the device data respectively for each remote controllable device. As described above, the device data preferably is transmitted by a wireless communication from each of the data sources 22*a-c* in the controllable devices 20*a-c* via the short range wireless interface 12 of the mobile telephone 10. Once the device data is obtained by the mobile telephone 10, the device data may be received by the device selector 50 via the registration interface 52, and stored in the device selection database 60. As depicted in FIG. 4, the device selection database 60 may form part of the device selector 50. Additionally or alternatively, the database may be stored in a separate memory device within the mobile telephone, such as memory 45 (see FIG. 3). In exemplary embodiments, the device selection database may be stored onto a removable memory or storage device and uploaded into another electronic device. The device selection database also may otherwise be transmitted between electronic devices over conventional wired or wireless interfaces. In this manner, the device selection functionality may be shared among various user portable electronic devices. For example, in a household of several family members, each having his or her own separate mobile telephone, the control functionality may be shared among the user devices so the registration process need only be performed once.

The registration process is repeated so as to register each of the plurality of remote controllable devices in the device selection database 60. A user may subsequently update the device selection database by adding devices, removing devices, and/or editing the device data.

With a plurality of remote controllable devices being registered, as referenced above a user may administer an input to the mobile phone 10 to perform a device selection process. As part of the device selection process, the device selector 50 may first determine the location of mobile telephone 10 (FIG. 1, step 120).

As seen in FIG. 4, device selector 50 may include a position locator 54 configured to determine position data corresponding to a position of the mobile telephone 10. The location or position of the mobile telephone (or other user portable electronic device) may be determined by utilizing one or more of a variety of known positioning capability technologies. For example, such technologies may include short range positioning using active signaling relative to a short range signal emitter, or various other wireless technologies such as a Bluetooth device, WI-FI positioning, room acoustics data, GPS data, and other comparable positioning technologies. In one embodiment, the controllable devices 20*a-c* may include an active signal emitter that aids in determining the position of the user mobile telephone. For example, such signal emitters may be incorporated into the data sources 22*a-c*, or provided as a separate component.

By determining the location or position of the remote controllable devices 20*a-c* in the registration process, and additionally determining the location or position data of the mobile telephone 10, the location of the mobile telephone relative to each of the remote controllable devices is known. As further explained below, the user may then select one of the remote controllable devices to be controlled simply by looking at or facing the desired or targeted device. In exemplary embodiments, therefore, the mobile telephone 10 may receive orientation data corresponding to the orientation of the user (FIG. 1, step 130).

Figure 6:
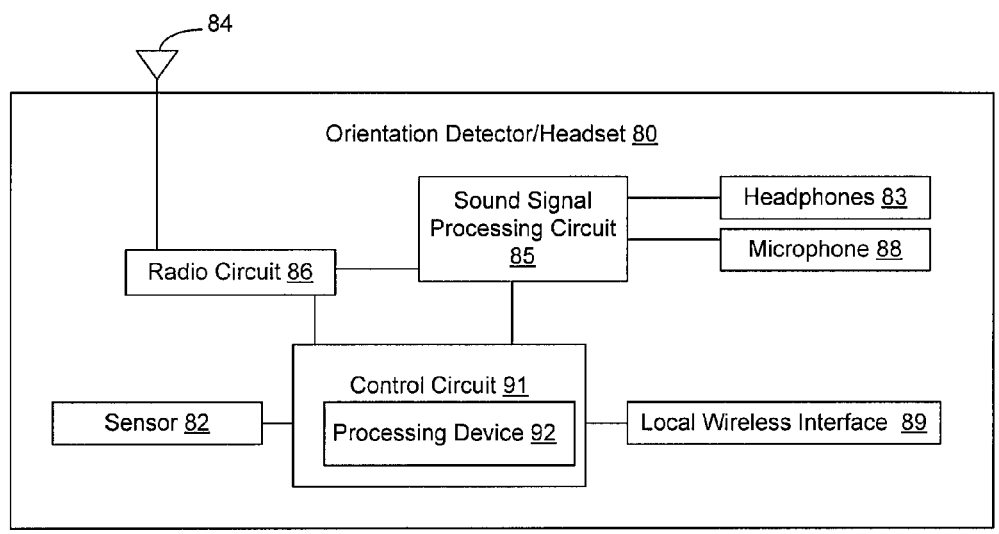
FIG. 6 is a schematic block diagram depicting operative portions of an exemplary orientation detector/headset for use in accordance with embodiments of the present invention.

Referring again to FIG. 5, exemplary embodiments of the remote control system 200 may additionally include an orientation detector 80 for detecting an orientation of a user. In exemplary embodiments, the orientation detector is provided in the form of a headset 80. FIG. 6 represents a functional block diagram of operative portions of the headset 80. Referring to FIGS. 5 and 6, the headset may include a frame portion 81, which supports the various components. The frame portion may constitute a lightweight securing device as is conventional, which permits the headset to be worn comfortably on the user's head. The headset also may include a speaker system in the form of headphones 83, and a microphone 88. Headphones 83 and microphone 88 may be used for conversing in a telephone calling mode. Headphones 83 also may constitute a speaker system for reproducing sound to the user during audiovisual applications, such as gaming, listening to music, or watching audiovisual content. In addition, the headset may have an antenna 84 for communication with other electronic devices. For example, as depicted by the jagged arrow in FIG. 5, the headset may communicate with the mobile telephone 10 over a short range wireless interface, such as a Bluetooth or comparable wireless interface.

As seen in FIG. 6, the antenna 84 of the headset may be coupled to a radio circuit 86. The radio circuit 86 includes a radio frequency transmitter and receiver for transmitting and receiving signals via the antenna 84 as is conventional. The headset 80 further includes a sound signal processing circuit 85 for processing audio signals transmitted by and received from the radio circuit 86. Coupled to the sound processing circuit 85 are the headphones 83 and microphone 88. A local wireless interface 89, such as a Bluetooth, RF, infrared, or other short distance interface, may be used to transmit and receive data from other electronic devices, as is conventional. The headset also may contain a control circuit 91, which may include a processing device 92, which controls overall operation of the headset. It will be appreciated that the general headset structure depicted in FIGS. 5 and 6 is exemplary and not intended to limit the scope of the invention. Other general headset configurations may be employed.

The headset may be employed in the selection of one of the remote controllable devices 20*a-c*. In particular, the headset may include one or more sensors 82 that may be utilized to generate orientation data corresponding to an orientation of a user. The sensor 82, for example, may be a motion detector, such as an accelerometer, compass sensor, room acoustic sensor, or comparable motion detector that may detect motion and the resultant orientation of the user's head as being commensurate with the orientation of the headset. The orientation data may be generated based on the detected motion of the headset.

In other embodiments, the sensor 82 may be an electronic receiver for receiving a short range wireless signal from a signal emitting device. For example, as stated above, the controllable devices 20*a-c* may include an active signal emitter. The signal emitters may transmit periodic pulse signals that would identify the controllable transmitting device. Again, such signal transmitters may be incorporated into the data sources 22*a-c*, or provided as a separate component. The headset sensor may be in the form of a receiver for receiving the signals transmitted from the data sources. When the headset is facing the television 20*c*, for example, sensor 82 would receive a pulse signal from the data source 22*c* of the television 20*c*. This would indicate the headset is facing the television, i.e. the user is looking at the television. Commensurate pulse signals would be transmitted from the other remote controllable devices, with the signal from a given device being received by the sensor 82 when the user is looking at or facing such device. The orientation data thus may be generated based on the received signals from the data sources.

As another alternative embodiment, the sensor 82 may be in the form of a digital camera for generating a digital image in a viewing direction of the headset. In this embodiment, the sensor generates a digital image from which a target remote controllable device may be recognized. The orientation data thus may be generated as image data generated by the digital camera.

The sensor 82, therefore, may operate pursuant to various technologies to generate orientation data corresponding to the orientation of the user, which is outputted to and received by the mobile telephone 10. In exemplary embodiments, regardless of the nature of the input to the sensor 82, an output of orientation data may be outputted from the headset 80 to the mobile phone 10 over a wireless communication pathway, as depicted by the jagged arrow in FIG. 5. For example, if the sensor 82 is in the form of an accelerometer or other motion and orientation sensor, the headset may output orientation data indicating the motion and resultant orientation of the headset. If the sensor 82 is an electronic signal receiver, the headset may output orientation data by relaying an identifying signal emitted from a target remote controllable device 20. If the sensor 82 is a camera, the headset may output orientation data as digital image data of a controllable device 20 within the field of view of the camera.

It will be appreciated that the orientation data may be multi-dimensional. At least two orientation dimensions would be ascertainable. In particular, a user may be able to alter orientation in the horizontal direction to select different remote controllable devices across a scanned field of view. In addition, the orientation in the vertical direction would be ascertainable, which would, for example, permit the user to select a remote controllable device from among multiple devices in a stacked configuration, as may be common for audiovisual components. In certain other embodiments, depth perpendicularly from the user also may be considered as part of the orientation data.

Regardless of the form, the orientation data may be received in the mobile telephone 10 by a wireless communication via the short range wireless interface 12, and inputted into the orientation interface 56 of the device selector 50. From the orientation data, the orientation interface may then determine the orientation of the headset, which in turn typically would be commensurate with the orientation or facing direction of the user.

As described above, therefore, the device selector 50 of the mobile telephone 10 may receive or generate the following parameters: (1) remote controllable device data (including device location and identification data) received from the data sources 22*a-c* respectively of the controllable devices 20*a-c*, and stored in the device selection database 60 in the registration process; (2) mobile telephone position data generated by the data positioning capabilities of position locator 54; and (3) orientation data based on inputs to the sensor 82 of the headset 80, and transmitted to the orientation interface 56. From these data parameters, the data selector 50 of mobile telephone 10 selects which of the plurality of remote controllable devices 20*a-c* is to be the remote controlled device (FIG. 1, step 140).

In this manner, the device selector 50 of the mobile telephone 10 may be considered the "brains" of the remote control system 200 for selecting a remote controlled device. Referring again to FIG. 4, the three above-referenced parameters may be inputted into and processed by the controller 58 of the device selector 50 to select a remote controlled device based on the direction in which a user is facing or looking. From such processing, the device selector 50 selects a remote controlled device to be controlled from among the plurality of remote controllable devices 20*a-c*.

Actual control of the remote controlled device may be implemented in a variety of fashions. In one exemplary embodiment, as depicted in FIG. 4, the device selector 50 may include an output interface 62 configured to generate a device selection signal (see also FIG. 1, step 150). As seen in FIG. 5, the device selection signal may be transmitted from the mobile telephone 10 by a wireless communication to a remote control device 26. The remote control device 26 may be a universal remote control device that has the capability to control multiple devices. In response to receipt of the device selection signal from the mobile telephone 10, the remote control device 26 may implement the device selection signal by automatically configuring itself to control the selected device.

In another exemplary embodiment, the mobile telephone 10 itself may have remote control capabilities for remotely controlling one or more devices. In such an embodiment, the controller 41, 42 of the mobile telephone may implement the device selection signal generated by the device selector 50 by automatically configuring itself to control the selected device. A mobile telephone may be employed to receive inputs of remote control commands by any conventional means. For example, commands may be entered using the keypad inputs to the keypad 18, by selecting control commands from a menu displayed on the display 14, or by utilizing other typical input mechanisms.

Figure 7:
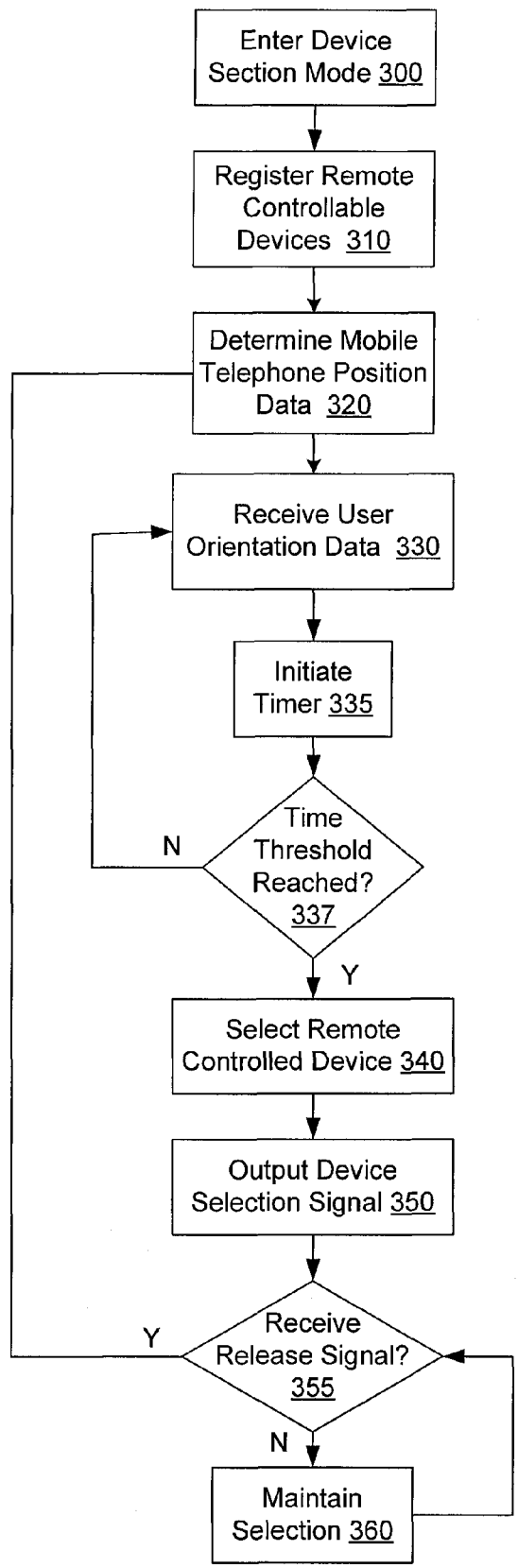
FIG. 7 depicts another exemplary method of selecting a device for remote control from among a plurality of remote controllable devices.

FIG. 7 depicts an overview of another exemplary method of selecting a device for remote control from among a plurality of remote controllable devices. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

FIG. 7 bears similarity in its initial steps to the exemplary method embodied in FIG. 1. For example, comparably to the embodiment of FIG. 1, in the embodiment of FIG. 7 a mobile telephone (or other suitable electronic device) may: enter a device selection mode (step 300); register a plurality of remote controllable devices (step 310); determine mobile telephone position data (step 320); and receive user orientation data (step 330). Steps 300-330 may be performed in a manner comparably as described with respect to steps 100-130 of FIG. 1. FIG. 7 addresses additional issues that may arise in connection with the device selection process.

Under certain circumstances, the orientation of the user, i.e., where the user is looking, may be directed sequentially toward more than one remote controllable device prior to a device selection. Referring back to FIG. 5 for example, suppose upon entry into the device selection mode, the user and user headset are oriented toward the light switch 20*a*, but the user actually wishes to select the television 20*c* as the remote controlled device. As the user scans, thereby altering the orientation toward the television 20*c*, at one point the user/headset may be oriented toward the toy car 20*b*, which is between the light switch and the television. It would be desirable for the user to be able to select the television without intermediately and undesirably selecting the other devices.

To address such issue, a timing step may be administered as to the orientation data. Referring to FIG. 7, at step 330 orientation data is received, which indicates the user is oriented at a given remote controllable device. At step 335, a timer may be initiated. For example, the device selector 50 may include a timer 64 (see FIG. 4). At step 337, a determination may be made as to whether a time threshold has been reached without an alteration of the orientation. Although any time may be used as a threshold, a time of about three to five seconds or similar may be suitable. If the time threshold is not reached, i.e., the user orientation changes before the time threshold is reached, the method may return to step 330 for receipt of new or updated orientation data. If at step 337, however, the orientation remains fixed for the threshold time and the threshold time is thus reached, the method may proceed to step 340 at which the remote controlled device is selected.

Applied to the above example, upon entering the device selection mode, suppose the user/headset may be oriented at the light switch 20*a*, but the user wishes that the television 20*c* be selected for control. Accordingly, the headset would not be oriented toward the light switch for any appreciable time, and the threshold time would not be reached. As the user scans toward the television 20*c*, at one point the headset intermediately may be oriented toward the toy car 20*b*. As the user is scanning toward the television, however, the headset would not be oriented toward the toy car for any appreciable time, and again the threshold time would not be reached. When the user's orientation reaches the television set, the user may hold this orientation for a time period sufficient to meet the threshold time. At step 340, the television would be selected as the remote controlled device. In this manner, the user may initiate the selection precisely of the television even though the user previously had been oriented toward the other remote controllable devices.

Once a specific remote controlled device is selected, it also may be desirable that the control of the device be maintained even if the user changes his orientation. In other words, after a remote controlled device has been selected, a user should not have to continuously look at or be oriented toward the selected device to maintain control. In an exemplary embodiment, therefore, the selection is effectively maintained until a release signal is generated.

Referring to FIG. 7, for example, at step 355 a determination may be made as to whether a release signal is received. If no release signal is received, at step 360 the selection of the previously selected device may be maintained. If at step 355 a release signal is received, control of the selected device may be released. In one embodiment, the method may return to step 320 so as to determine a new selection of another remote controlled device. In other words, as shown in FIG. 7, the system may re-determine the position data, receive new orientation data, and then again perform the selection process.

The release signal may be generated in a variety of ways. For example, the user may apply a dedicated release input to the keypad 18 of the mobile telephone 10, select a release command from a menu displayed on the display 14, or otherwise manually enter a release command input by any suitable means. In one embodiment, the release signal may be generated whenever the user exits the device selection mode. In this manner, the device selection is reset each time the user exits and enters the device selection mode anew. In one embodiment, a user may generate a release signal by altering the headset orientation toward a second, non-selected remote controllable device for a time period that reaches the time threshold for the orientation data. In this manner, following the release signal new orientation data (and perhaps new position data as well) may be received, thereby resulting in a new selection of a different one of the plurality of remote controllable devices.

In another alternative embodiment, the headset function may be performed by the mobile telephone 10. The headset, therefore, specifically need not be present in the system. In this embodiment, the mobile telephone may be the orientation detector, and the orientation data may be based upon the orientation of the mobile telephone itself. The user manually may alter the direction in which the mobile telephone is pointing or directed to generate the orientation data. For example, the orientation of the mobile telephone may be determined relative to the pointing direction of antenna 44, the wireless interface 12, or any other suitable component.

The described remote control system, including the various embodiments, provides a more efficient and user-friendly system for selecting a remote controlled device to be controlled from among a plurality of remote controllable devices in the system. Essentially, a user can select a given device simply by looking at it, which avoids the inefficiencies associated with the manual device selection in conventional systems.

Referring again to FIG. 3, additional features of the mobile telephone 10 will now be described. For the sake of brevity, generally conventional features of the mobile telephone 10 will not be described in great detail herein.

The mobile telephone 10 includes call circuitry that enables the mobile telephone 10 to establish a call and/or exchange signals with a called/calling device, typically another mobile telephone or landline telephone, or another electronic device. The mobile telephone 10 also may be configured to transmit, receive, and/or process data such as text messages (e.g., colloquially referred to by some as "an SMS," which stands for short message service), electronic mail messages, multimedia messages (e.g., colloquially referred to by some as "an MMS," which stands for multimedia message service), image files, video files, audio files, ring tones, streaming audio, streaming video, data feeds (including podcasts) and so forth. Processing such data may include storing the data in the memory 45, executing applications to allow user interaction with data, displaying video and/or image content associated with the data, outputting audio sounds associated with the data and so forth.

The mobile telephone 10 may include an antenna 44 coupled to a radio circuit 46. The radio circuit 46 includes a radio frequency transmitter and receiver for transmitting and receiving signals via the antenna 44 as is conventional. The mobile telephone 10 further includes a sound signal processing circuit 48 for processing audio signals transmitted by and received from the radio circuit 46. Coupled to the sound processing circuit 48 are a speaker 70 and microphone 72 that enable a user to listen and speak via the mobile telephone 10 as is conventional.

As indicated above, mobile telephone 10 has a display 14 viewable when the clamshell telephone is in the open position. The display 14 displays information to a user regarding the various features and operating state of the mobile telephone 10, and displays visual content received by the mobile telephone 10 and/or retrieved from a memory 45. Display 14 may be used to display pictures, video, and the video portion of multimedia content. Additional displays (not shown) may be provided on the outside of mobile telephone 10 that are visible when the clamshell is in the closed position.

The display 14 may be coupled to the control circuit 41 by a video processing circuit 74 that converts video data to a video signal used to drive the various displays. The video processing circuit 74 may include any appropriate buffers, decoders, video data processors and so forth. The video data may be generated by the control circuit 41, retrieved from a video file that is stored in the memory 45, derived from an incoming video data stream received by the radio circuit 46 or obtained by any other suitable method.

The mobile telephone 10 also may include an I/O interface 76 that permits connection to a variety of I/O conventional I/O devices. One such device is a power charger that can be used to charge an internal power supply unit (PSU) 78. To the extent, as referenced above, wired connections may be employed to implement the features of the present invention, I/O interface 76 may provide the connection interface.

Figure 8:
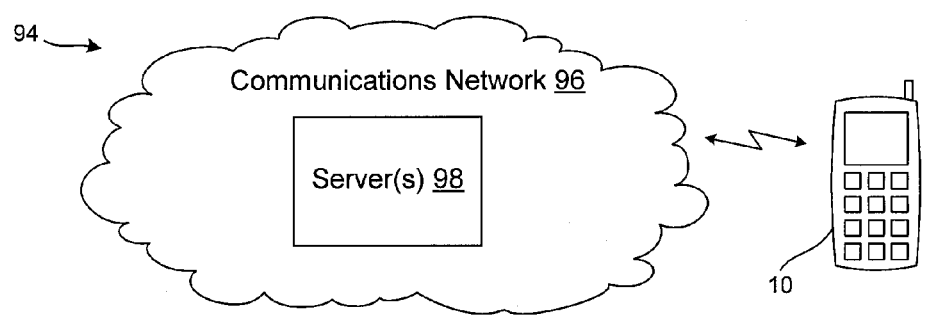
FIG. 8 is a schematic diagram of a communications system in which the mobile telephone of FIG. 2 may operate.

Referring to FIG. 8, the mobile telephone 10 may be configured to operate as part of a communications system 94. The system 94 may include a communications network 96 having a server 98 (or servers) for managing calls placed by and destined to the mobile telephone 10, transmitting data to the mobile telephone 10 and carrying out any other support functions. The server 98 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 94 may support the communications activity of multiple mobile telephones 10 and other types of end user devices. As will be appreciated, the server 98 may be configured as a typical computer system used to carry out server functions and may include a processor configured to execute software containing logical instructions that embody the functions of the server 98 and a memory to store such software.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. An electronic device comprising:
   a registration interface configured to register device data corresponding to a plurality of remote controllable devices;
   a position locator configured to determine position data corresponding to a position of the electronic device;
   an orientation interface configured to receive orientation data corresponding to an orientation of a user indicative of which one of the plurality of remote controllable devices the user is facing; and
   a controller configured to select a remote controlled device to be controlled from among the plurality of remote controllable devices, the selection being based on the device data, the position data, and the orientation data,
   wherein the orientation interface comprises a wireless interface for receiving the orientation data by a wireless communication.

2. The electronic device of claim 1, wherein the registration interface comprises a wireless interface for receiving the device data by a wireless communication.

3. The electronic device of claim 2, wherein the wireless interface comprises at least one of a Bluetooth, RFID, near field communication, or WI-FI interface.

4. The electronic device of claim 1, further comprising a device selection database for storing the device data corresponding to the plurality of remote controllable devices.

5. The electronic device of claim 1, further comprising an output interface configured to output a device selection signal corresponding to the selected remote controlled device.

6. A system for selecting a remote controlled device to be controlled from among a plurality of remote controllable devices, the system comprising:
   a plurality of remote controllable devices, wherein each of the plurality of remote controllable devices comprises a data source configured to provide device data corresponding to a respective remote controllable device;
   an orientation detector configured to generate orientation data corresponding to an orientation of a user indicative of which one of the plurality of remote controllable devices the user is facing; and
   an electronic device comprising a device selector, wherein the device selector is configured to receive the device data and the orientation data, and configured to select the remote controlled device from among the plurality of remote controllable devices based on the device data and the orientation data,
   wherein the electronic device has an orientation interface that receives the orientation data, and the orientation interface comprises a wireless interface for receiving the orientation data by a wireless communication.

7. The system of claim 6, wherein the device selector is further configured to determine position data corresponding to the position of the electronic device, and to select the remote controlled device from among the plurality of remote controllable devices additionally based on the position data.

8. The system of claim 6, wherein the at least one of the data sources is configured to transmit the device data wirelessly to the device selector.

9. The system of claim 8, wherein the at least one data source comprises an electronic tag containing the device data, and the electronic device comprises a reading device for reading the device data from the electronic tag.

10. The system of claim 8, wherein the at least one data source comprises a wireless signal emitter configured to transmit a signal containing the device data, and the electronic device comprises a receiver for receiving the signal containing the device data.

11. The system of claim 6, wherein the orientation detector comprises a headset to be worn by the user, the headset including a sensor, and the orientation data corresponds to an orientation of the headset as detected by the sensor.

12. The system of claim 11, wherein the headset sensor comprises a motion detector for detecting the motion of the headset, and the headset generates the orientation data based on the detected motion.

13. The system of claim 11, wherein the at least one data source comprises a wireless signal emitter configured to transmit a signal, the headset sensor comprises a receiver for receiving the signal transmitted from one of the at least one data source, and the headset generates the orientation data based on the received signal.

14. The system of claim 11, wherein the headset sensor comprises a digital camera, and the orientation data is image data generated by the digital camera.

15. The system of claim 11, wherein the headset and the electronic device comprise a wireless interface for transmitting the orientation data from headset to the electronic device by a wireless communication.

16. The system of claim 6, wherein the electronic device further comprises an output interface configured to output a device selection signal corresponding to the selected remote controlled device, and the system further comprises a remote control device configured to receive the device selection signal and control the selected remote controlled device.

17. A method of selecting, with a user electronic device, a remote controlled device for remote control from among a plurality of remote controllable devices comprising the steps of:
registering device data corresponding to the plurality of remote controllable devices;
determining position data corresponding to a position of the user electronic device;
receiving orientation data corresponding to an orientation of the user indicative of which one of the plurality of remote controllable devices the user is facing, wherein the user electronic device receives the orientation data over an orientation interface comprising a wireless interface for receiving the orientation data by a wireless communication; and
selecting a remote controlled device to be controlled from among the plurality of remote controllable devices, the selection being based on the device data, the position data, and the orientation data.

18. The method of claim 17, further comprising:
upon receiving the orientation data, initiating a timer; and
determining whether a threshold time of the timer is reached;
wherein if the threshold time is reached, selecting the remote controlled device, and if the threshold time is not reached, receiving new orientation data.

19. The method of claim 17, further comprising:
determining whether a release signal is received; and
if a release signal is not received, maintaining the selection of the remote controlled device, and if a release signal is received, selecting another remote controlled device for remote control from among the plurality of remote controllable devices.

* * * * *